United States Patent
Skweres et al.

(12)

(10) Patent No.: US 6,416,059 B1
(45) Date of Patent: Jul. 9, 2002

(54) BRASS INSERT MOLDED INTO "CHURCH WINDOW" OF SERVICE ACCELERATED RELEASE VALVE GASKET

(75) Inventors: Jeffrey B. Skweres, McKeesport; Vincent F. Troiani, New Florence; Gregory L. Johnston, Tarentum, all of PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/758,747

(22) Filed: Jan. 12, 2001

(51) Int. Cl.[7] ................................................ F16J 15/12
(52) U.S. Cl. ...................................... 277/649; 277/651
(58) Field of Search ................................ 277/634, 644, 277/648, 649, 650, 651, 653

(56) References Cited

U.S. PATENT DOCUMENTS

| 1,777,443 | A | * | 10/1930 | Mastin |
| 4,931,326 | A | * | 6/1990 | Weil |
| 5,492,343 | A | * | 2/1996 | Smith et al. |
| 5,615,898 | A | * | 4/1997 | Clark et al. |
| 5,671,927 | A | * | 9/1997 | Schweiger |
| 6,186,514 | B1 | * | 2/2001 | Ikeda et al. |

* cited by examiner

Primary Examiner—Anthony Knight
Assistant Examiner—John L. Beres
(74) Attorney, Agent, or Firm—James Ray & Associates

(57) ABSTRACT

The present invention provides a gasket for use in a service portion of a brake control valve in a railway braking system. The gasket comprises an elastomeric composition with a predetermined shape. There is a series of bead-like projections formed on the first surface of the gasket for sealing such gasket with a body portion of the valve. A first aperture is disposed in the gasket at a predetermined location for engagement with a projection on the filling piece of the service portion. A brass insert is molded into the elastomeric composition and has a second aperture formed therein. The second aperture is in fluid communication with an auxiliary reservoir of such railway braking system. A third aperture is formed in the gasket in a third predetermined location. A brass insert, which has a first predetermined configuration, is molded into the elastomeric composition of the gasket. The brass insert is disposed in a lower quadrant of the first surface of the gasket and has a fourth aperture disposed therein having a second predetermined configuration. The fourth aperture is in fluid communication with a brake pipe. There are bead like projections formed on the opposed planar second surface of the gasket that correspond to similar positions, but radially opposed, for each of the bead like projections formed on the first surface of the gasket. The bead like projections formed on second surface are for sealing contact with such filling piece of such service portion.

22 Claims, 4 Drawing Sheets

BRASS INSERT MOLDED INTO "CHURCH WINDOW" OF SERVICE ACCELERATED RELEASE VALVE GASKET

FIELD OF THE INVENTION

The present invention relates, in general, to railway braking systems and, more particularly, the present invention relates to a modification in the service accelerated release valve gasket to help eliminate emergency reservoir (ER) to brake pipe (BP) gasket leakage.

BACKGROUND OF THE INVENTION

Braking systems on railway vehicles, or with any type of moving vehicle, is an extremely important component. Any problems that occur in a braking system are deemed to be serious and attempts to eliminate or improve any such problems are given the highest priority.

Since the introduction of pneumatic braking systems more than 125 years ago, such railway braking systems have been constantly modified and revised to improve braking performance. Some of the improvements may have seemed minor, however, any improvement that can make a braking system more reliable and, thus, safer is never looked upon as minor.

New freight brake control valves, empty/load equipment, single sided brake pipe brackets, along with single car testing equipment, composition brake shoes and a multitude of other improvements have been introduced through the years. These new members have, in turn, been modified and altered in a constant effort to improve the braking systems. Whenever a problem has cropped up in any facet of the braking system on railway vehicles efforts throughout the railroad industry have been undertaken almost immediately to alleviate the problem, even if the problem appeared to be a minor one because, as mentioned previously, no problem is minor with respect to braking.

Some problems have sporadically been encountered during periods under high pressure differential conditions. When a high pressure differential condition exists between ER and BP, with ER being the higher pressure, distortion of a gasket can occur in the service portion of a brake control valve. Depending on the magnitude of the distortion, the gasket's ability to seal can be affected which can, therefore, affect emergency braking.

SUMMARY OF THE INVENTION

Therefore, the present invention provides a gasket for use in a service portion of a brake control valve in a railway braking system. The gasket comprises an elastomeric composition having a predetermined shape which includes a first surface and a opposed planar second surface. There is a first at least one bead like projection formed on the first surface of the gasket closely adjacent an outer periphery of the first surface and extending around the outer periphery of the first surface. Such bead like projection assists in sealing the gasket to a body of such service portion of such brake control valve.

There is a first aperture disposed in the gasket having a first predetermined location and a first predetermined diameter. The first aperture is in fluid communication with Emergency Reservoir and for engagement with a projection disposed on a filling piece of such service portion of such brake control valve. A second at least one bead like projection is formed on the first surface around an outer circumference of the first aperture for sealing the gasket to such body of such service portion of such brake control valve.

A brass insert is molded into the elastomeric composition and disposed in a second predetermined location. The brass insert has a second aperture, which has a second predetermined diameter, formed therein. The second aperture is in fluid communication with an auxiliary reservoir of such railway braking system. A third at least one bead like projection is formed around the second aperture on the first surface in a generally U-shape with an open part of the U contacting a portion of the first at least one bead like projection. Again this bead like projection is for sealing the gasket with such body of such service portion of such brake control valve.

A third aperture is formed in the gasket in a third predetermined location and has a third predetermined diameter. There is a fourth at least one bead like projection that is formed on the first surface between the second at least one bead like projection and a portion of the first at least one bead like projection. Again such bead like projection aid in the sealing of the gasket with such body of such service portion of such brake control valve. A fifth at least one bead like projection is formed on the first surface between the second at least one bead like projection and a portion of the first at least one bead like projection. The fifth at least one bead like projection being axially opposed from the fourth at least one bead like projection. A sixth at least one bead like projection is formed on the first surface between the second at least one bead like projection and a portion of the first at least one bead like projection for sealing the gasket with such body of such service portion of such brake control valve. The sixth at least one bead like projection being substantially transverse to the fourth and the fifth at least one bead like projection.

A brass insert having a first predetermined configuration is molded into the elastomeric composition of the gasket. The brass insert is disposed in a lower quadrant of the first surface of the gasket and has a fourth aperture formed therein. The fourth aperture is in fluid communication with a brake pipe in such body of such service portion of such brake control valve. The fourth aperture has a second predetermined configuration.

There is at least one bead like projection formed on the radially opposed second surface of the gasket and positioned such that the at least one bead like projection formed on the radially opposed second surface of the gasket correspond to similar positions, but radially opposed, for each of the first, the second, the third, the fourth, the fifth and the sixth of the at least one bead like projection formed on the first surface of the gasket. The at least one bead like projection formed on the radially opposed second surface of the gasket is for sealing contact with such filling piece of such service portion of such brake control valve. A dowel projection having a third predetermined configuration is disposed on the radially opposed second surface of the gasket for engagement with a cavity in such filling piece of such service portion of such brake control valve.

OBJECTS OF THE INVENTION

It is, therefore, one of the primary objects of the present invention to provide a gasket which will resist leakage under high pressure differential conditions.

It is another object of the present invention to provide a gasket which will possess greater rigidity so the gasket will retain its position.

It is still another object of the present invention to provide a gasket with brass inserts which will provide the strength necessary to reduce or prevent incidence of leakage.

It is yet another object of the present invention to provide a gasket which will not only have the rigidity necessary to resist leakage under periods of high differential pressure but will maintain good sealing properties.

In addition to the various objects and advantages of the present invention which have been described in some specific detail above, various additional objects and advantages of the present invention will become much more readily apparent to those persons who are particularly skilled in the relevant railroad braking systems from the following more detailed description of such invention, particularly, when such detailed description is taken in conjunction with the attached drawing Figures and with the appended claims.

Figure 1:
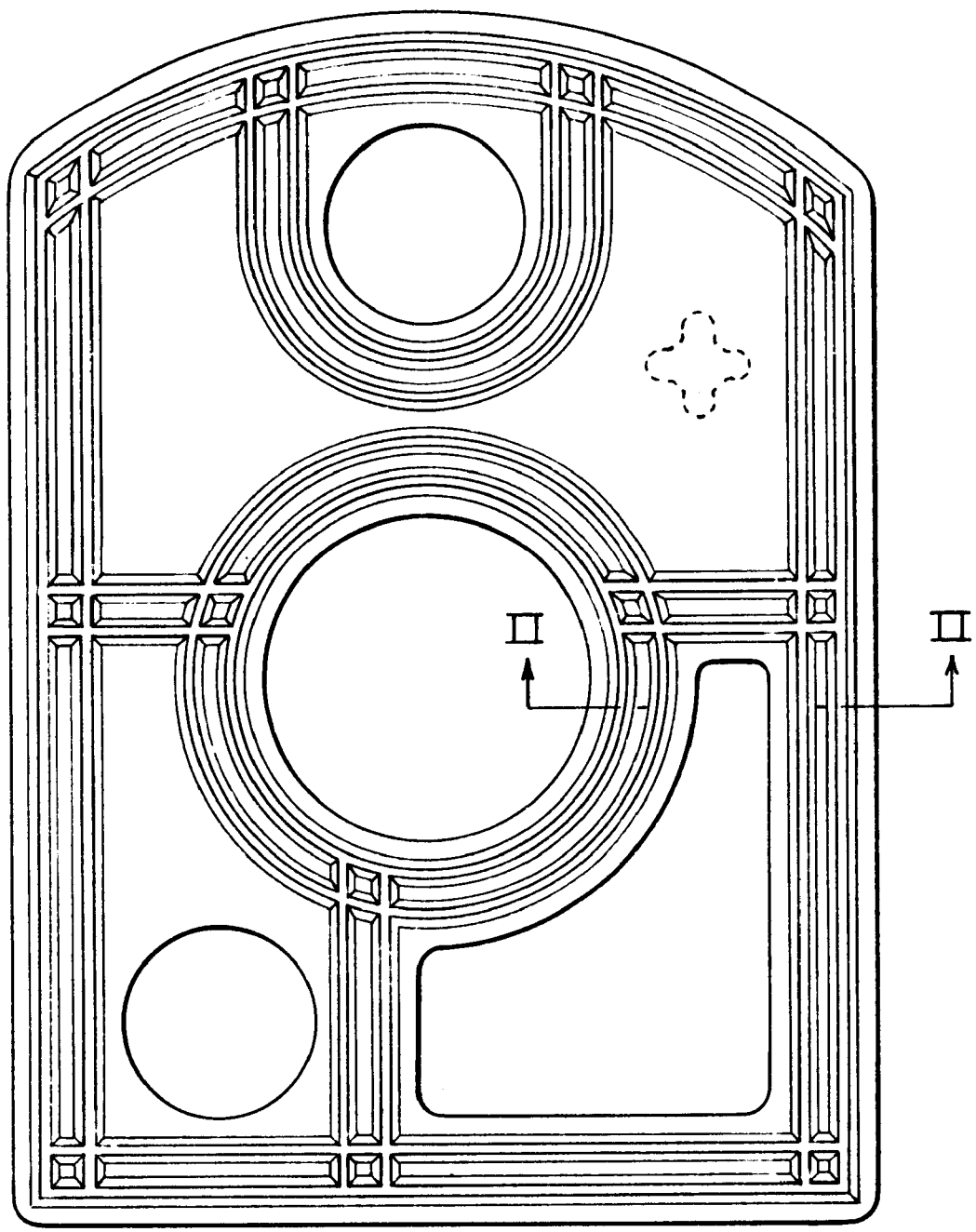
FIG. 1 is a planar view of a first surface of a prior art gasket.
Figure 2:
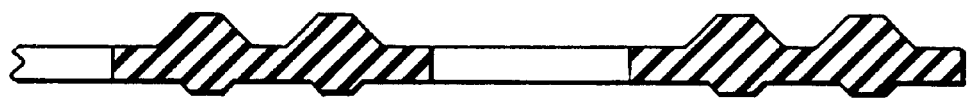
FIG. 2 is an enlarged cross-sectional view taken across the lines of II—II of the prior art gasket shown in FIG. 1.
Figure 3:
FIG. 3 is a side view of the prior art gasket shown in FIG. 1.
Figure 4:
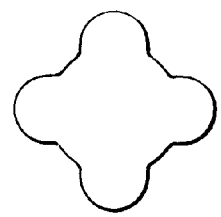
FIG. 4 is an enlarged view of the dowel disposed on a second surface of the prior art gasket shown in FIG. 1.

BRIEF DESCRIPTION OF THE PRESENTLY PREFERRED AND VARIOUS ALTERNATE EMBODIMENTS OF THE INVENTION

Prior to proceeding to the more detailed description of the present invention, it should be noted that for the sake of clarity in understanding the invention, identical components with identical functions have been designated with identical reference numerals throughout the drawing Figures.

Before referring to the drawing Figures it should be noted that the basic shape and many of the features of the prior art gasket are still present in the gasket of the present invention; however, the present invention solves one of the critical problems that has been encountered in this portion of the braking system.

Figure 5:
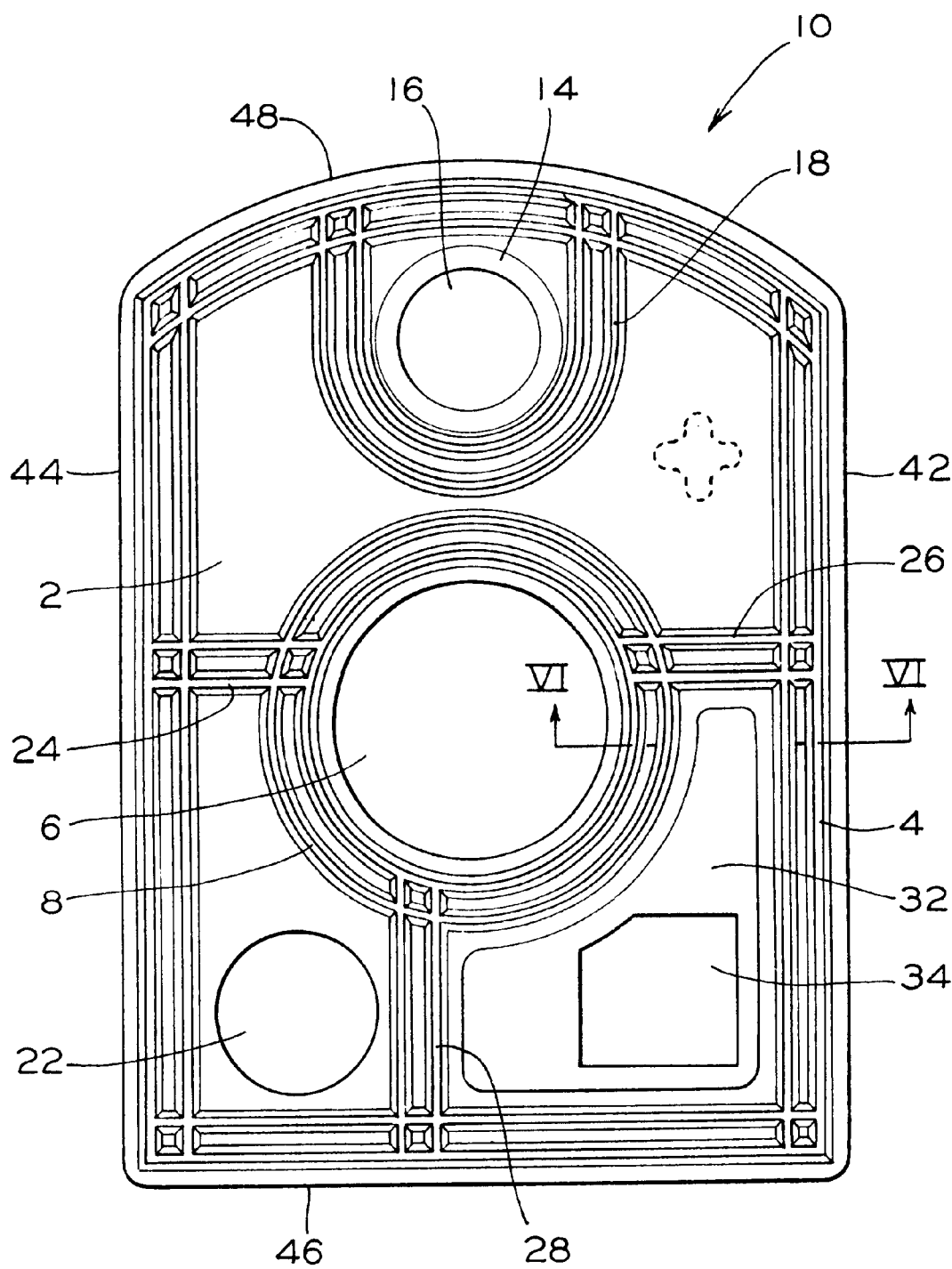
FIG. 5 is a planer view of a first surface of a gasket according to a first embodiment of the invention.
Figure 6:
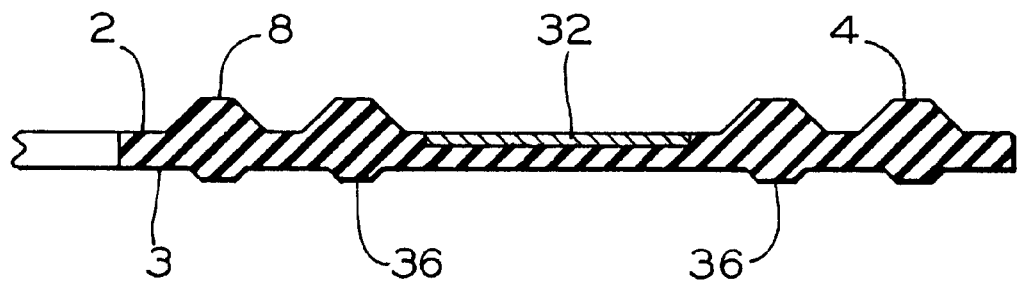
FIG. 6 is an enlarged cross-sectional view taken across the lines of VI—VI of the gasket shown in FIG. 5 according to an embodiment of the invention.
Figure 7:
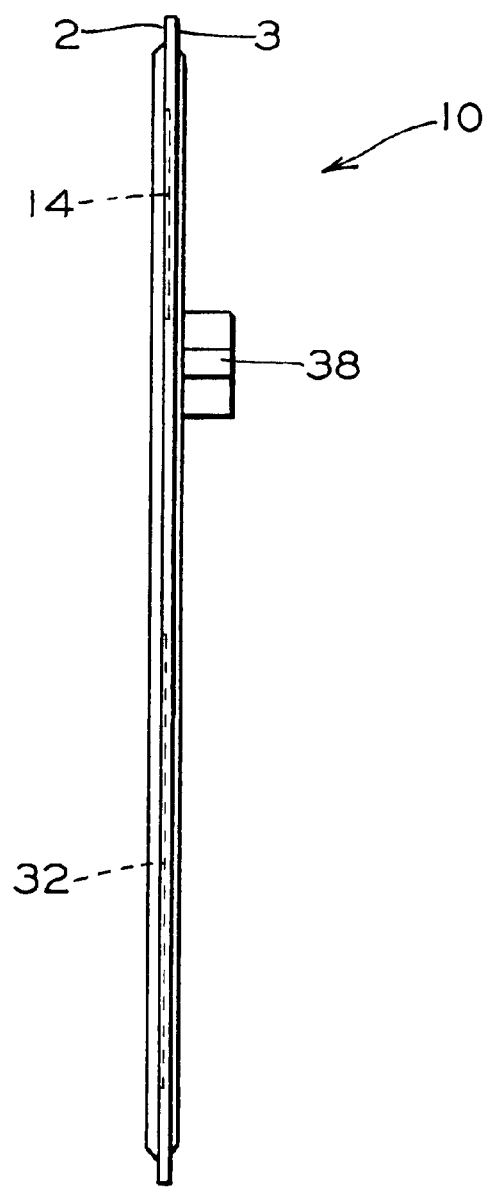
FIG. 7 is a side view of the gasket shown in FIG. 5.

Reference is now made to FIGS. 5 thru 7. Illustrated therein is a gasket, according to the present invention, for maintaining the gasket in its proper position and for sealing the gasket between the body portion and the filling piece of the service portion of a brake control valve of a railway braking system.

The present invention provides a gasket, generally designated 10, for use in a service portion of a brake control valve in a railway braking system. The gasket 10 comprises an elastomeric composition having a predetermined shape which includes a first surface 2 and a second surface 3 that is an opposite planar surface to such first surface 2. There is a first at least one bead like projection 4 formed on the first surface 2 of the gasket closely adjacent an outer periphery of the first surface 2 and extending around the outer periphery of the first surface 2. Such bead like projection 4 aids in sealing the gasket 10 to a body (not shown) of such service portion of such brake control valve.

There is a first aperture 6 disposed in the gasket 10 having a first predetermined location and a first predetermined diameter. The first aperture 6 is for engagement with a projection disposed on a filling piece (not shown) of such service portion of such brake control valve. A second at least one bead like projection 8 is formed on the first surface around and closely adjacent to the outer circumference of the first aperture 6 for sealing the gasket to such body of such service portion of such brake control valve.

A brass insert 14 is molded into the elastomeric composition and disposed in a second predetermined location. There is a second aperture 16 formed through the brass insert 14, such second aperture 16 has a second predetermined diameter. The second aperture 16 is in fluid communication with an auxiliary reservoir of such railway braking system. A third at least one bead like projection 18 is formed closely adjacent the second aperture 16 on the first surface in a generally U-shape with an open part of the U-shape contacting a portion of the first at least one bead like projection 4. Again this bead like projection 18 is for sealing the gasket with such body of such service portion of such brake control valve.

A third aperture 22 is formed in the gasket in a third predetermined location and has a third predetermined diameter. There is a fourth at least one bead like projection 24 that is formed on the first surface 2 between the second at least one bead like projection 8 and a portion of the first at least one bead like projection 4. Again such bead like projection 24 aids in the sealing of the gasket 10 with such body of such service portion of such brake control valve. A fifth at least one bead like projection 26 is formed on the first surface 2 between the second at least one bead like projection 8 and a portion of the first at least one bead like projection 4. The fifth at least one bead like projection 26 being axially opposed from the fourth at least one bead like projection 24. A sixth at least one bead like projection 28 is formed on the first surface 2 between the second at least one bead like projection 8 and a portion of the first at least one bead like projection 4 for sealing the gasket with such body of such service portion of such brake control valve. The sixth at least one bead like projection 28 being substantially transverse to the fourth and the fifth at least one bead like projection 24, 26.

A brass insert 32 having a first predetermined configuration is molded into the elastomeric composition of the gasket 10. The brass insert 32 is disposed in a lower quadrant of the gasket 10. Such brass insert 32 has a fourth aperture 34 disposed therein. The fourth aperture 34 is in fluid communication with a brake pipe in such body of such service portion of such brake control valve. The fourth aperture 34 has a second predetermined configuration. It is preferred that such brass insert 32 be disposed on a lower right quadrant of such first surface 2 of such gasket 10.

There is at least one bead like projection 36 formed on the opposite planar second surface of the gasket 3 and positioned such that the at least one bead like projection 36 formed on the opposite planar second surface 3 of the gasket 10 correspond to similar positions, but on the opposed planar surface, for each of the first, the second, the third, the fourth, the fifth and the sixth of the at least one bead like projection, (4, 8, 18, 24, 26 and 28) formed on the first surface 2 of the gasket 10. The at least one bead like projection 36 formed on such opposite planar second surface 3 of the gasket 10 are for sealing contact with such filling piece of such service portion of such brake control valve. The at least one bead like projection 36 formed on the opposite planar second surface 3 of the gasket 10 are not as pronounced (do not protrude out from the surface as far) as the at least one bead like projections (4, 8, 18, 24, 26 and 28) formed on the first surface 2 of the gasket 10. This is evident in FIG. 6. It is also presently preferred that the at least one bead like projections 36 on the opposite planar second surface 3 be formed as two projections.

A dowel projection 38 having a third predetermined configuration is disposed on the opposite planar second surface 3 of the gasket 10 for engagement with a cavity in such filling piece of such service portion of such brake control valve.

It must be noted that the brass inserts 14 and 32 are molded into the elastomeric composition of the gasket. These inserts 14, 32 give the gasket 10 rigidity and keep the gasket in position and thereby resist the force that tends to distort the gasket 10 when there is high differential pressure and cause it to "move" into the filling piece of the service portion of the brake control valve.

The gasket 10 has a first predetermined shape which includes a pair of side edges forming a right edge 42 and a left edge 44 of the first surface 2 and the radially opposed second surface 3. The pair of side edges 42, 44 have a first predetermined length. There is a transverse bottom edge 46 connected adjacent one end of the pair of side edges 42, 44. The bottom edge 46 has a second predetermined length, and there is a top edge 48, opposite the transverse bottom edge 46, that is connected adjacent a second end of the pair of side edges 42, 44. The top edge 48 has a generally arcuate shape. The shape and configuration of the gasket 10 have caused it to be referred to as a "church window" and the description referring to side edges and top and bottom edges obviously refer to the gasket in position in the service portion of the brake control valve when the valve is in an upright position.

In a presently preferred embodiment of the invention such first aperture 6 has it's center disposed substantially on the intersection of a first axis that perpendicularly crosses substantially a midpoint of the bottom edge 46, and on a second axis transverse to the first axis. The second axis crosses substantially a midpoint of the pair of side edges 42,44. It is also presently preferred that the bead like projections 8 formed on the first surface 2 around the outer circumference of first aperture 6 are formed as substantially concentric circles.

Also in a presently preferred embodiment of the invention such second aperture 16 has its center disposed on the same first axis in a substantially upper portion of the gasket 10. As stated previously, this aperture 16 is formed in the brass insert 14 that is molded into the elastomeric composition of the gasket 10.

It is also presently preferred that such at least one bead like projection for such first 4, such second 8, such third 18, such fourth 24, such fifth 26 and such sixth 28 are all formed as a pair of bead like projections. These projections provide sealing of the first side 2 of the gasket 10 against the body portion of the service portion of the brake control valve. Further the fourth and fifth set of two bead like projections 24 and 26 are formed substantially parallel to second axis and are disposed intermediate the second axis and top edge of gasket 48. It is also presently preferred that such corresponding bead-like projections 36 on the second surface 3 are also disposed as a pair of projections.

It is presently preferred that the first predetermined configuration of the brass insert 32 is basically defined by an area in the lower right quadrant of the first surface 2 of gasket 10 between the first two bead like projections 2, the second two bead like projections 8, the fifth two bead like projections 26 and the sixth two bead like projections 28. The brass insert 32 is molded into the elastomeric composition and basically covers this lower right quadrant. The fourth aperture 34 that is formed in the brass insert 32 has a preferred distinctive configuration in that it is basically a square with one corner truncated.

As is evident in FIG. 6, which is a cross section of the gasket 10, the bead like projections 36 on the second surface 3 are not as pronounced as the bead-like projections (4,8, 18,24,26,28) on the first surface 2 and it is also presently preferred that these bead like projections on the radially opposed second surface also be in pairs as are the projections on the first surface of the gasket 10.

The brass inserts of the present invention give added support to the double bead projections to help prevent them from distorting out into the filling piece. These brass inserts give the gasket greater rigidity and, thus, keep the gasket in its proper position while the double bead projections provide the sealing with the body portion and filling piece of the service portion of the brake control valve.

While both the presently preferred and additional alternative embodiments of the present invention have been described in detail above it should be understood that various other adaptations and modifications of the present invention can be envisioned by those persons who are skilled the relevant art of railway braking systems without departing from either the spirit of the invention or the scope of the appended claims.

We claim:

1. A gasket for use in a service portion of a brake control valve in a railway braking system, said gasket comprising;
    (a) an elastomeric composition having a predetermined shape, said predetermined shape including a first surface and an opposed planar second surface;
    (b) a first at least one bead like projection formed on said first surface of said gasket closely adjacent an outer periphery of said first surface and extending around said outer periphery of said first surface for sealing said gasket to a body of such service portion of such brake control valve;
    (c) a first aperture disposed in said gasket having a first predetermined location and a first predetermined diameter, said first aperture for engagement with a projection disposed on a filling piece of such service portion of such brake control valve;
    (d) a second at least one bead like projection formed on said first surface around and closely adjacent an outer circumference of said first aperture for sealing said gasket to such body of such service portion of such brake control valve;
    (e) a brass insert molded into said elastomeric composition and disposed in a second predetermined location;
    (f) a second aperture having a second predetermined diameter formed through said brass insert and said elastomeric composition, said second aperture in fluid communication with an auxiliary reservoir of such railway braking system;
    (g) a third at least one bead like projection, formed closely adjacent said second aperture on said first surface in a generally U-shape with an open part of said U-shape contacting a portion of said first at least one bead like projection for sealing said gasket with such body of such service portion of such brake control valve;
    (h) a third aperture formed in said gasket in a third predetermined location and having a third predetermined diameter;
    (i) a fourth at least one bead like projection formed on said first surface between said second at least one bead like projection and a portion of said first at least one bead like projection for sealing said gasket with such body of such service portion of such brake control valve;

(j) a fifth at least one bead like projection formed on said first surface between said second at least one bead like projection and a portion of said first at least one bead like projection, said fifth at least one bead like projection being axially opposed from said fourth at least one bead like projection;

(k) a sixth at least one bead like projection formed on said first surface between said second at least one bead like projection and a portion of said first at least one bead like projection for sealing said gasket with such body of such service portion of such brake control valve, said sixth at least one bead like projection being substantially transverse to said fourth and said fifth at least one bead like projection;

(l) a brass insert having a first predetermined configuration molded into said elastomeric composition of said gasket, said brass insert disposed in a first predetermined quadrant of said gasket;

(m) a fourth aperture formed through said brass insert and said elastomeric composition for fluid communication with a brake pipe in such body of such service portion of such brake control valve, said fourth aperture having a second predetermined configuration;

(n) a plurality of bead like projections formed on said opposed planar second surface of said gasket positioned such that said at least one bead like projection formed on said opposed planar second surface of said gasket correspond to similar positions, but on said opposed planar second surface, for each of said first, said second, said third, said fourth, said fifth and said sixth of said at least one bead like projection formed on said first surface of said gasket, said at least one bead like projection formed on said opposed planar second surface of said gasket for sealing contact with such filling piece of such service portion of such brake control valve; and (o) a dowel projection having a third predetermined configuration disposed on said opposed planar second surface of said gasket for engagement with a cavity in such filling piece of such service portion of such brake control valve.

2. A gasket for use in a service portion of a brake control valve, according to claim 1, wherein said first predetermined shape includes a pair of substantially parallel edges, said pair of substantially parallel edges having a first predetermined length, a third edge substantially transverse to said parallel edges connected adjacent one end of said pair of substantially parallel edges, and having a second predetermined length, and a fourth edge opposite said third edge connected adjacent a second end of said pair of substantially parallel edges, said fourth edge having a generally arcuate shape.

3. A gasket for use in a service portion of a brake control valve, according to claim 2, wherein said first aperture has it's center disposed substantially at the intersection of a first axis perpendicularly crossing substantially a midpoint of said third edge and a second axis transverse to said first axis and crossing substantially a midpoint of said pair of substantially parallel edges.

4. A gasket for use in a service portion of a brake control valve, according to claim 3, wherein said second aperture has its center disposed on said first axis in a portion of said gasket closely adjacent said fourth edge.

5. A gasket for use in a service portion of a brake control valve, according to claim 1, wherein said first at least one bead like projection is formed on said first surface of said gasket as two bead like projections.

6. A gasket for use in a service portion of a brake control valve, according to claim 1, wherein said second at least one bead like projection is formed on said first surface of said gasket as two bead like projections.

7. A gasket for use in a service portion of a brake control valve, according to claim 6, wherein said second two bead like projections formed on said first surface around an outer circumference of said first aperture are formed as substantially concentric circles.

8. A gasket for use in a service portion of a brake control valve, according to claim 1, wherein said third at least one bead like projection is formed on said first surface of said gasket as two bead like projections.

9. A gasket for use in a service portion of a brake control valve, according to claim 3, wherein said fourth at least one bead like projection is formed on said first surface of said gasket as two bead like projections.

10. A gasket for use in a service portion of a brake control valve, according to claim 3, wherein said fifth at least one bead like projection is formed on said first surface of said gasket as two bead like projections.

11. A gasket for use in a service portion of a brake control valve, according to claim 3, wherein said sixth at least one bead like projection is formed on said first surface of said gasket as two bead like projections.

12. A gasket for use in a service portion of a brake control valve, according to claim 8, wherein said fourth two bead like projections are formed substantially parallel to said second axis intermediate said second axis and said fourth edge of said gasket.

13. A gasket for use in a service portion of a brake control valve, according to claim 9, wherein said fifth two bead like projections are formed substantially parallel to said second axis intermediate said second axis and said fourth edge of said gasket.

14. A gasket for use in a service portion of a brake control valve, according to claim 10, wherein said sixth two bead like projections are further disposed intermediate said first axis and one of said pair of substantially parallel edges of said first surface.

15. A gasket for use in a service portion of a brake control valve, according to claim 1, wherein said first predetermined configuration is defined by an area in said first predetermined quadrant between said first at least one bead like projection, said second at least one bead like projection, said fourth at least one bead like projection and said fifth at least one bead like projection.

16. A gasket for use in a service portion of a brake control valve, according to claim 1, wherein said second predetermined configuration is substantially a square.

17. A gasket for use in a service portion of a brake control valve, according to claim 16, wherein said substantially square has a truncated corner.

18. A gasket for use in a service portion of a brake control valve, according to claim 1, wherein said third predetermined location is in a second predetermined quadrant of said gasket.

19. A gasket for use in a service portion of a brake control valve, according to claim 1, wherein said at least one bead like projection formed on said opposed planar second surface of said gasket corresponding to said similar position, but on said opposed planar second surface, of said first at least one projection includes two bead like projections.

20. A gasket for use in a service portion of a brake control valve, according to claim 1, wherein said at least one bead like projection formed on said opposed planar second surface of said gasket corresponding to said similar position, but on said opposed planar second surface, of said second at least one projection includes two bead like projections.

21. A gasket for use in a service portion of a brake control valve, according to claim 1, wherein said at least one bead like projection formed on said opposed planar second surface of said gasket corresponding to said similar position, but on said opposed planar second surface, of said third at least one projection includes two bead like projections.

22. A gasket for use in a service portion of a brake control valve, according to claim 1, wherein said at least one bead like projection formed on said opposed planar second surface of said gasket corresponding to said similar positions, but on said opposed planar second surface, of said fourth, said fifth and said sixth at least one projection includes two bead like projections.

\* \* \* \* \*